Patented Sept. 18, 1923.

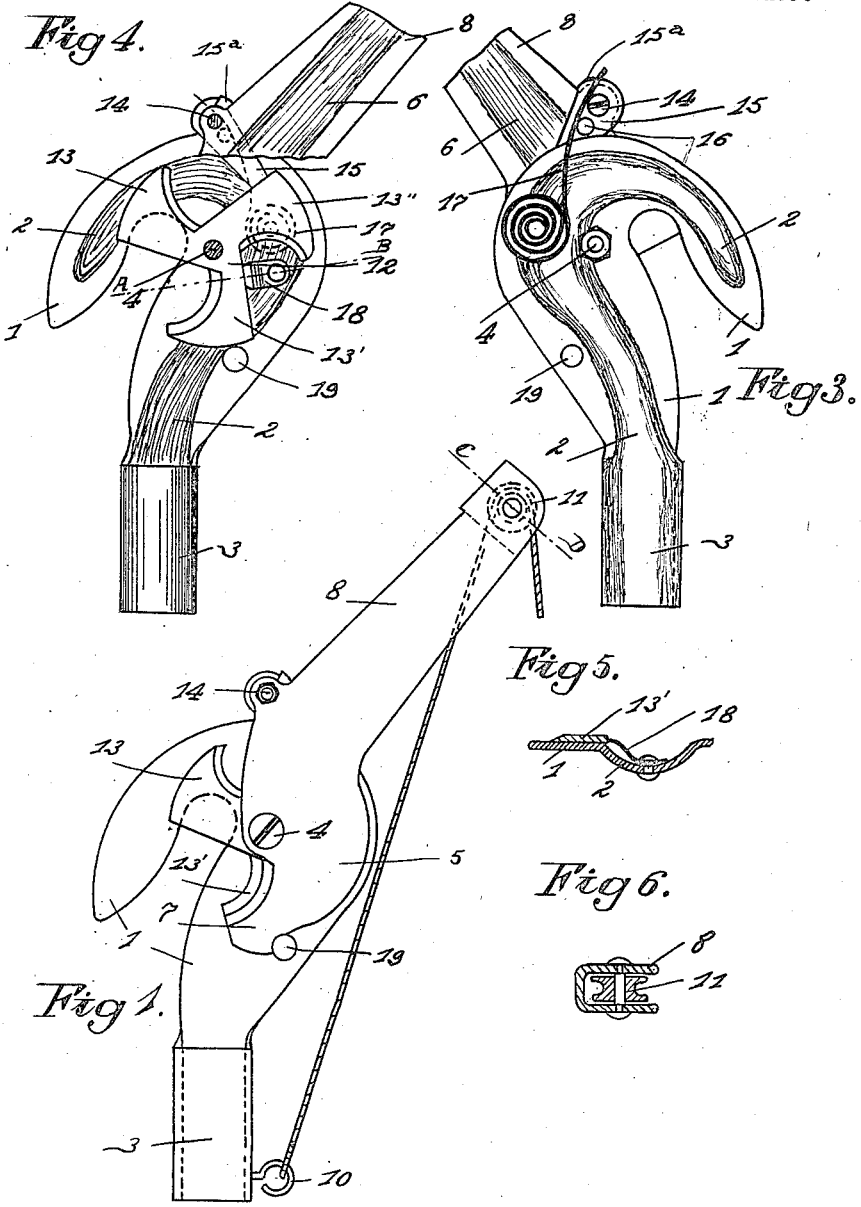

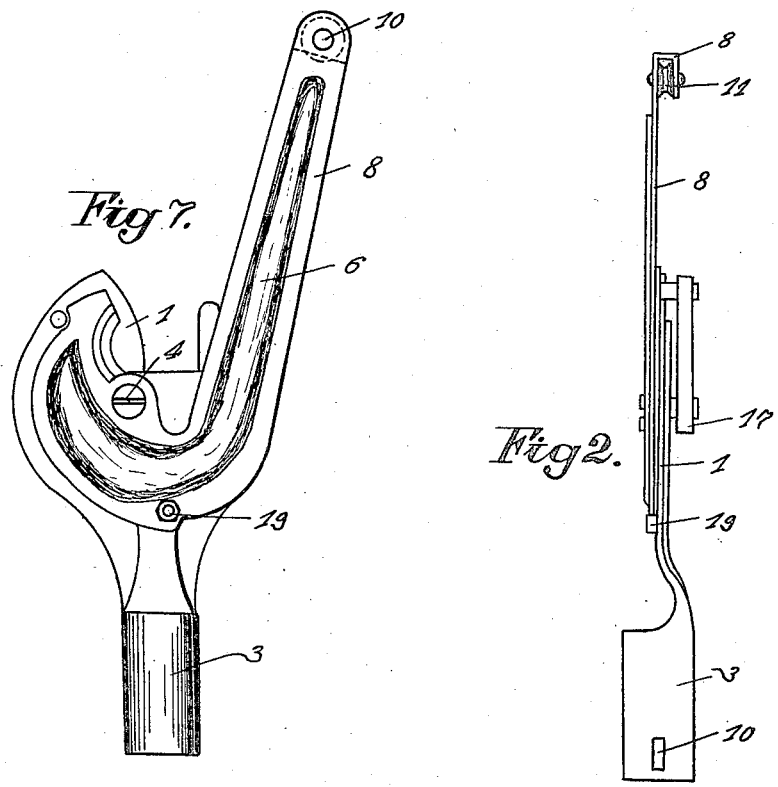

1,468,554

UNITED STATES PATENT OFFICE.

MARIUS BLANC AND FRANCIS BERGER, OF ST. ETIENNE, FRANCE.

PRUNING IMPLEMENT.

Application filed March 25, 1922. Serial No. 546,786.

*To all whom it may concern:*

Be it known that we, MARIUS BLANC and FRANCIS BERGER, citizens of the French Republic, and residents of St. Etienne, Loire, France, have invented certain new and useful Improvements in Pruning Implements, of which the following is a specification.

Our present invention relates to improvements in pruning implements of the type comprising a hook, a tubular extension for securing the same on the end of a rod or pole and a movable lever.

The object of our invention is to provide a device of this kind having a rotatable cutter with three cutting edges, arranged to be actuated by the movable lever of the device through the agency of a suitable pawl, said movable lever being also provided with a cutting edge, the angle of cut of which forming the extension of the angle of cut of the cutting blades.

A further object of the invention is to provide a device of the kind described, which will be cheap in manufacture, simple in construction and of high efficiency in practice, as will be more fully described hereinafter with reference to the accompanying drawings, wherein:

Fig. 1 is a front view.

Fig. 2 is a side view and

Fig. 3 is a rear view of the device.

Fig. 4 is a view according to Fig. 1, the movable blade being broken away.

Fig. 5 is a section on line A—B of Fig. 2.

Fig. 6 is a section on line C—D of Fig. 1.

Fig. 7 is a front view of a construction form.

Referring more particularly to the drawings, the device comprises a hook 1 made of sheet steel provided with grooves 2, said hook being preferably made integral with a tubular extension 3, whereby the same may be secured on the end of a rod or pole not shown. A rotary cutter comprising three cutting blades 13, 13′, 13″, is mounted on an axis, preferably formed by a screw 4, on which a lever 8 is pivotally arranged. Said lever 8 has two unequal arms, the short arm thereof ending in a cutting blade, the angle of cut of which forming the extension of the angle of cut of the blades of the rotary cutter. Upon lowering the lever 8, which may be effected as in ordinary clearing devices by means of a cord attached to the eye 10 and passing around the pulley 11 at the end of the lever 8, the pawl 15 carries the blade 13′ with it, whilst the blade 13 will be brought into action to cut the branch. The apparatus is shaped in such a way that in this cutting operation, the resistance will be produced exactly on the bottom of the hook 1ª, whereby the latter will be effectively prevented from being opened or widened under the strain. As soon as the lever 8 has reached the end of its stroke, limited by the stop 19, a spring 18 housed within the rib of the hook will prevent the rotary cutter from moving backwardly, whilst an outer spring 17 will bring the lever 8 back to its initial position, at the same time holding pawl 15 against the cutter, so that the latter will occupy the position shown in Fig. 1, as soon as it reaches the straight portion of the next blade.

The apparatus is arranged and combined so that the rotary cutter may be removed if desired, whereupon the apparatus will be similar to an ordinary device for clearing of caterpillars.

The tubular extension 3 may be arranged in any desired position with relation to the remaining parts of the apparatus, and said tubular extension may be more particularly arranged as shown in Fig. 7, which shows an apparatus in which the long arm of the lever G is slightly modified, so that the same enables to cut from above.

Having now fully described our said invention, what we claim and desire to secure by Letters Patent, is:

1. In an improved device of the class described the combination with a hook, a tubular extension, a two-armed pivotally mounted lever and a cutting edge at the end of the short arm of said lever, of a rotary cutter having three cutting blades, mounted on the pivot pin of said lever so that the position of the short arm of the lever forms the extension of the angle of cut of said cutting blades, substantially as set forth.

2. In an improved device of the class described the combination with a hook, a tubular extension, a two-armed pivotally mounted lever and a cutting edge at the end of the short arm of said lever, of a rotary cutter having three cutting blades, mounted on the pivot-pin of said lever so that the position of the short arm of the lever forms the extension of the angle of cut of said cutting blades, and a spring arranged to prevent the rotary cutter from moving backwardly after the operation of said lever, substantially as set forth.

3. A pruning implement, including a hook having a cutting edge, a cutter having a plurality of cutting blades rotatably mounted on said hook so that the blades will cooperate with the cutting edge of the hook successively in a step by step rotation of the cutter, a lever pivotally mounted on the hook, and means carried by the lever for engaging the cutter to produce the step by step rotation thereof in an oscillating movement of the lever.

4. A pruning implement, including a hook having a cutting edge, a cutter having a plurality or radially extending cutting blades, rotatably mounted on the hook for step by step movement so that the blades will cooperate successively with the cutting edge of the hook, and means for imparting a step by step motion to the cutter.

5. A pruning implement, including a hook having a cutting edge, a cutter having a plurality of radially extending cutting blades, rotatably mounted on the hook so that the blades will successively cooperate with the cutting edge of the hook in a step by step rotation of the cutter, a lever mounted on the hook for oscillating movement, and a pawl carried by the lever for engaging the cutter blades to produce the step by step rotation thereof in the oscillating movement of the lever.

6. A pruning implement, including a hook having a cutting edge, a cutter having a plurality of cutting blades thereon, rotatably mounted on the hook for step by step movement so that the blades will cooperate successively with the cutting edge of the hook, a lever mounted on the axis of the cutter for oscillating movement, manual means for operating the lever in one direction, resilient means normally operating the lever in the other direction, and means carried by the lever for engaging the cutter to produce the step by step rotation thereof in the oscillation of the lever.

7. A pruning implement, including a hook having a cutting edge, a cutter having a plurality of cutting blades rotatably mounted on the hook for step by step movement so that the cutting blades will cooperate successively with the cutting edge of the hook, a lever pivotally mounted on the hook and adapted for oscillating movement on the pivot, a stop limiting the movement of the lever, means for normally retaining the lever in engagement with the stop, means carried by the lever for engaging the cutter blades to produce the step by step movement in the oscillation of the lever, and means for normally holding the cutter blades stationary at the end of each step movement.

In testimony whereof we have hereunto set our hands in presence of two witnesses.

BLANC, [L. S.]
FRANCIS BERGER [L. S.]

Witnesses:
C. OFFERMENT,
C. OUTRAMER.